(12) United States Patent
Kim et al.

(10) Patent No.: US 7,277,639 B2
(45) Date of Patent: Oct. 2, 2007

(54) BI-DIRECTIONAL OPTICAL ADD/DROP MULTIPLEXER FOR WDM OPTICAL NETWORKS

(75) Inventors: Jong-Kwon Kim, Taejonkwangyok-shi (KR); Ki-Cheol Lee, Suwon-shi (KR); Seong-Taek Hwang, Pyongtaek-shi (KR); Jun-Ho Koh, Suwon-shi (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 541 days.

(21) Appl. No.: 10/754,030

(22) Filed: Jan. 8, 2004

(65) Prior Publication Data

US 2004/0228630 A1  Nov. 18, 2004

(30) Foreign Application Priority Data

May 12, 2003 (KR) ............... 10-2003-0029891

(51) Int. Cl.
*H04J 14/02* (2006.01)
(52) U.S. Cl. ............... 398/83; 398/45; 398/46; 398/82
(58) Field of Classification Search .......... 398/3, 398/5, 7, 14, 58, 67, 45–46, 82–83
See application file for complete search history.

(56) References Cited

U.S. PATENT DOCUMENTS

| | | | |
|---|---|---|---|
| 6,288,810 B1* | 9/2001 | Grasso et al. | 398/9 |
| 6,438,286 B1* | 8/2002 | Duerksen et al. | 385/24 |
| 6,999,653 B2* | 2/2006 | Lee et al. | 385/24 |
| 7,024,116 B2* | 4/2006 | Orbach et al. | 398/83 |
| 2002/0122440 A1* | 9/2002 | Doerr | 370/535 |

FOREIGN PATENT DOCUMENTS

| CN | 1316659 A | 10/2001 |
|---|---|---|
| CN | 1318925 A | 10/2001 |

* cited by examiner

*Primary Examiner*—Dzung Tran
(74) *Attorney, Agent, or Firm*—Cha & Reiter, L.L.C.

(57) ABSTRACT

Disclosed is a bi-directional optical add/drop multiplexer connected to an optical fiber for transmitting optical signals multiplexed in a wavelength division multiplexing optical network and which performs adding/dropping of the optical signals. The optical add/drop multiplexer includes a first wavelength division multiplexer provided with a multiplexing port functioning as a path for forward or backward optical signals and with a plurality of demultiplexing ports, each functioning as a path of demultiplexed channels. A plurality of add/drop parts, each performing adding/dropping of preset channels, and connected with the demultiplexing ports of the first wavelength division multiplexer in one-to-one. A second wavelength division multiplexer connected with the plurality of add/drop parts in one-to-one, provided with a plurality of demultiplexing ports, each functioning as a path for demultiplexed channels and with a multiplexing port functioning as a path for forward or backward optical signals. The first wavelength division multiplexer has a free spectral range equal to that of the second wavelength division multiplexer, in which a wavelength band of the forward optical signals is included in the free spectral range having one period, while a wavelength band of the backward optical signals is included in the free spectral range having another period.

12 Claims, 7 Drawing Sheets

BI-DIRECTIONAL OPTICAL ADD/DROP MULTIPLEXER FOR WDM OPTICAL NETWORKS

CLAIM OF PRIORITY

This application claims priority to an application entitled "Bi-directional Optical Add/Drop Multiplexer for WDM Optical Networks," filed in the Korean Intellectual Property Office on May 12, 2003 and assigned Serial No. 2003-29891, the contents of which are hereby incorporated by reference.

BACKGROUND OF THE INVENTION

1. Field of the Invention

The present invention relates to a wavelength division multiplexing (WDM) optical network, and more particularly, to a bi-directional optical add/drop multiplexer for performing channel adding/dropping of multiplexed optical signals traveling in a forward or backward direction in an optical network.

2. Description of the Related Art

As WDM technology for transmitting a plurality of channels having different wavelengths from each other through a single-cored optical fiber became commercialized, it has made it possible to transmit a high-capacity optical signal at a high speed. Moreover, development of optical device technology has made it possible to route or switch optical signals and/or to add or drop optical signals in an optical fashion, and thereby it is possible to establish an optical network based on WDM technology.

Typically, an add/drop multiplexer includes a pair of wavelength division multiplexers and a plurality of optical switches. The wavelength division multiplexer may, for example, make use of an arrayed-waveguide grating (AWG) having an extensible channel, simple control and excellent integration. The optical switch may make much use of a 2×2 optical space switch or an optical fiber Bragg grating (FGB) having a wavelength dependency, as an example.

FIG. 1 shows a construction of the conventional bi-directional optical add/drop multiplexer. The optical add/drop multiplexer 100 includes two circulators 120,130, an 8×8 AWG 150, six optical switches 141 to 146, two optical band pass filters (OBPFs) 160,170. The first and second circulators, the 8×8 AWG, and the six optical switches all include a plurality of ports. Herein, if a reference numeral of the corresponding element is given as "xxx", an $n^{th}$ port of the element will be indicated by a reference numeral of "xxxn" (or "xxxn'"), where n is a natural number. Particularly, when the reference numeral is represented as "xxxn'", it means that the $n^{th}$ port is located on the right side. The first circulator 120 includes three ports 1201 to 1203, which are designed to output optical signals input into one, i.e., an upper port or an adjacent lower port. The first circulator 120 outputs forward optical signals, input into the second port 1202, to the third port 1203. While it outputs backward optical signals, input from the first port 1201, to the second port 1202. The second port 1202 of the first circulator 120 is connected with an optical fiber 110 for transmitting multiplexed optical signals. The forward optical signals include three channels λ1 to λ3, which have different wavelengths from each other. The backward optical signals also include three channels λ5 to λ7, which have different wavelengths from each other.

The second circulator 130 includes three ports 1301 to 1303, which are designed to output optical signals input into one, i.e., an upper port or an adjacent lower port. The second circulator 130 outputs backward optical signals, input into the second port 1302, to the third port 1303, while it outputs forward optical signals, input from the first port 1301, to the second port 1302. The second port 1302 of the second circulator 130 is connected with an optical fiber 110 for transmitting multiplexed optical signals.

The AWG 150 is provided with eight left-side ports 1501 to 1508 on one end, and with eight right-side ports 1501' to 1508' on the other end. The fourth and eighth left- and right-sided ports 1504 and 1508; and 1504' and 1508' each function as a path for multiplexed optical signals. The first to third left-side ports 1501 to 1503, the fifth to seventh left-side ports 1505 to 1507, the first to third right-side ports 1501' to 1503', and the fifth to seventh right-side ports 1505' to 1507' each function as a path for demultiplexed optical signals. In the AWG 150, the fourth left-side port 1504 is connected with the third port 1203 of the first circulator 120, the fourth right-side port 1504' is connected with the third port 1303 of the second circulator 130.

During operation, the AWG 150 demultiplexes forward optical signals input into the fourth left-side port 1504 and outputs the demultiplexed three channels λ1 to λ3 to the three right-side ports 1501' to 1503'. The AWG 150 then multiplexes the demultiplexed three channels λ1 to λ3 input into the fifth to seventh right-side ports 1505' to 1507' and output the multiplexed forward optical signals to the eighth left-side port 1508. Further, the AWG 150 demultiplexes backward optical signals input into the fourth right-side port 1504' and outputs the demultiplexed fifth to seventh channels λ5 to λ7 to the fifth to seventh left-side ports 1505 to 1507. The AWG 150 then multiplexes the demultiplexed fifth to seventh channels λ5 to λ7 input into the three left-side ports 1501 to 1503 and to output the multiplexed backward optical signals to the eighth right-side port 1508'.

The first and sixth optical switches 141 to 146 are each provided with first and second ports 1411 and 1412; 1421 and 1422; 1431 and 1432; 1441 and 1442; 1451 and 1452; and 1461 and 1462, which are disposed on one side of each optical switch. The first and sixth optical switches 141 to 146 are each also provided with third and fourth ports 1413 and 1414; 1423 and 1424; 1433 and 1434; 1443 and 1444; 1453 and 1454; and 1463 and 1464, which are disposed on the other side of each optical switch. In a bar (or, parallel) state, the first and third ports 1411 and 1413; 1421 and 1423; 1431 and 1433; 1441 and 1443; 1451 and 1453; and 1461 and 1463 are connected in pairs, and the second and fourth ports 1412 and 1414; 1422 and 1424; 1432 and 1434; 1442 and 1444; 1452 and 1454; and 1462 and 1464 are also connected in pairs. In contrast, in a cross state, the first and fourth ports 1411 and 1414; 1421 and 1424; 1431 and 1434; 1441 and 1444; 1451 and 1454; and 1461 and 1464 are connected in pairs, and the second and third ports 1412 and 1413; 1422 and 1423; 1432 and 1433; 1442 and 1443; 1452 and 1453; and 1462 and 1463 are also connected in pairs. The first optical switch 141 is connected to the first and fifth right-sided ports 1501' and 1505' of the AWG 150. The second optical switch 142 is connected to the second and sixth right-side ports 1502' and 1506' of the AWG 150, the third optical switch 143 is connected to the third and seventh right-side ports 1503' and 1507' of the AWG 150, the fourth optical switch 144 is connected to the first and fifth left-side ports 1501 and 1505 of the AWG 150, the fifth optical switch 145 is connected to the second and sixth left-side ports 1502 and 1506 of the AWG 150, the sixth optical switch 146 is connected to the third and seventh left-side ports 1503 and 1507 of the AWG 150.

The first OBPF 160 has a preset wavelength pass band including the wavelength band of the forward optical signals to remove noise. The first OBPF 160 is connected with the eighth left-side port 1508 of the AWG 150 and the first port 1301 of the second circulator 130.

The second OBPF 170 has a preset wavelength pass band including the wavelength band of the backward optical signals to remove noise. The second OBPF 170 is connected with the eighth right-side port 1508' of the AWG 150 and the first port 1201 of the first circulator 120.

Hereinafter, a description will be made, for example, regarding a first case where the optical add/drop multiplexer 100 drops the first channel λ1 from the forward optical signals including the first to third channels λ1 to λ3, and a second case where the optical add/drop multiplexer 100 adds the fifth channel λ5 to the backward optical signals including the sixth and seventh channels λ6 and λ7.

A controlling unit (not shown) controls the first and fourth optical switches 141 and 144 into a cross state. Further, it controls the other optical switches 142, 143, 145 and 146 into a bar state. First, in terms of the first case, forward optical signals input into the second port 1202 of the first circulator 120 are output to the third port 1203. The AWG 150 demultiplexes the forward optical signals input into the fourth left-side port 1504 and outputs the demultiplexed first to third channels λ1 to λ3 to the first to third right-sided ports 1501' to 1503'. The first optical switch 141 outputs the first channel λ1 input into the second port 1412 to split the first channel λ1. The second and third optical switches 142 and 143 output the second and third channels λ2 and λ3, input into the second ports 1422 and 1432, to the fourth ports 1424 and 1434. The AWG 150 multiplexes the second and third channels λ2 and λ3 input into the sixth and seventh right-side ports 1506' and 1507' and output the multiplexed forward optical signals to the eighth left-side port 1508. The forward optical signals passing through the first OBPF 160 are input into the first port 1301 of the second circulator 130. The second circulator 130 outputs the forward optical signals input into the first port 1301 to the second port 1302.

Next, in terms of the second case, backward optical signals input into the second port 1302 of the second circulator 130 are output to the third port 1303. The AWG 150 demultiplexes the backward optical signals input into the fourth right-side port 1504' and outputs the demultiplexed sixth and seventh channels λ6 and λ7 to the sixth and seventh left-side ports 1506 and 1507. The fourth optical switch 144 outputs the fifth channel λ5 input into the second port 1442 to the fourth part 1444. The fifth and sixth optical switches 145 and 146 output the sixth and seventh channels λ6 and λ7, which are input into the second ports 1452 and 1462, to the fourth ports 1454 and 1464. The AWG 150 multiplexes the fifth to seventh channels λ5 to λ7, which are input into the first to third left-side ports 1501 to 1503, and output the multiplexed backward optical signals to the eighth right-side port 1508'. The backward optical signals passing through the second OBPF 170 are input into the first port 1201 of the first circulator 120. The first circulator 120 outputs the backward optical signals inputt into the first port 1201 to the second port 1202.

As mentioned above, the conventional optical add/drop multiplexer employing the N×N AWG takes a fold-back form in which (n−2) numeral ports on the opposite sides are connected to each other in pairs, and makes use of two ports on the opposite sides as a path for multiplexed optical signals. Therefore, there is a problem in that the number of channels available in reality is restricted to (n−2).

SUMMARY OF THE INVENTION

Accordingly, the present invention has been made to solve the above-mentioned problems occurring in the prior art, and an object of the present invention is to provide a bi-directional optical add/drop multiplexer capable of extending the number of available channels compared with that of the prior art.

In order to accomplish these objects, there is provided a bi-directional optical add/drop multiplexer connected to an optical fiber for transmitting optical signals multiplexed in a wavelength division multiplexing optical network and which performs adding/dropping of the optical signals. The bi-directional optical add/drop multiplexer includes a first wavelength division multiplexer provided with a multiplexing port that functions as a path for forward or backward optical signals and with a plurality of demultiplexing ports, each functioning as a path of demultiplexed channels. A plurality of add/drop parts, each performing adding/dropping of preset channels, and connected with the demultiplexing ports of the first wavelength division multiplexer in one-to-one. A second wavelength division multiplexer connected with the plurality of add/drop parts in one-to-one, provided with a plurality of demultiplexing ports, each functioning as a path for demultiplexed channels and with a multiplexing port functioning as a path for forward or backward optical signals. The first wavelength division multiplexer has a free spectral range equal to that of the second wavelength division multiplexer, in which a wavelength band of the forward optical signals is included in the free spectral range having one period, while a wavelength band of the backward optical signals is included in the free spectral range having another period.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
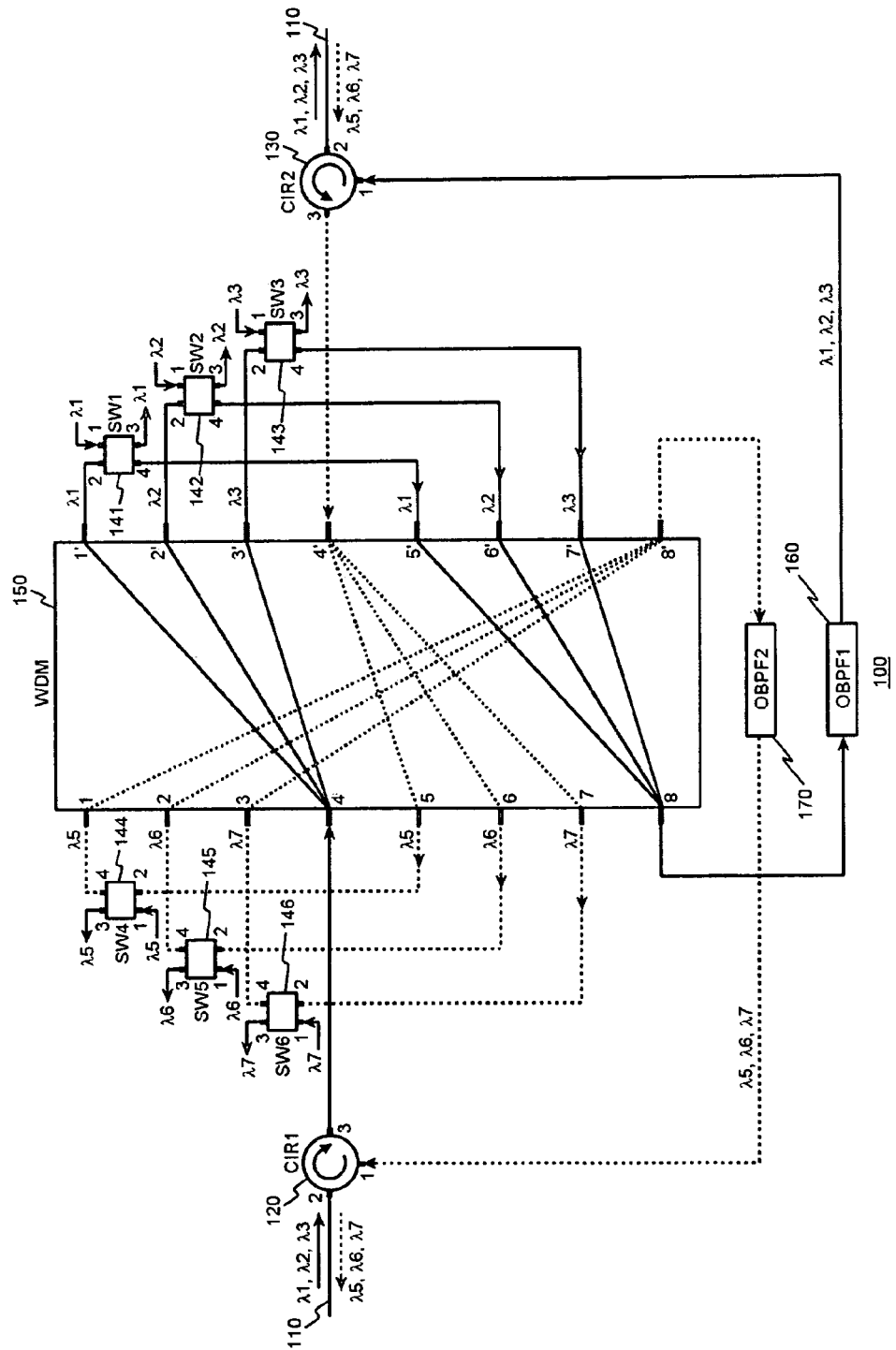
FIG. 1 shows a construction of the conventional bi-directional optical add/drop multiplexer.

Hereinafter, preferred embodiments of the present invention will be described in detail with reference to the accompanying drawings. For the purposes of clarity and simplicity, a detailed description of known functions and configurations incorporated herein will be omitted as it may make the subject matter of the present invention unclear.

A bi-directional optical add/drop multiplexer and a bi-directional optical add/drop part according to the present invention are each provided with a plurality of ports, wherein if a reference numeral of the corresponding element is given as "xxx", an $n^{th}$ port of the element will be indicated by a reference numeral of "xxxn", where n is a natural number.

Figure 2:
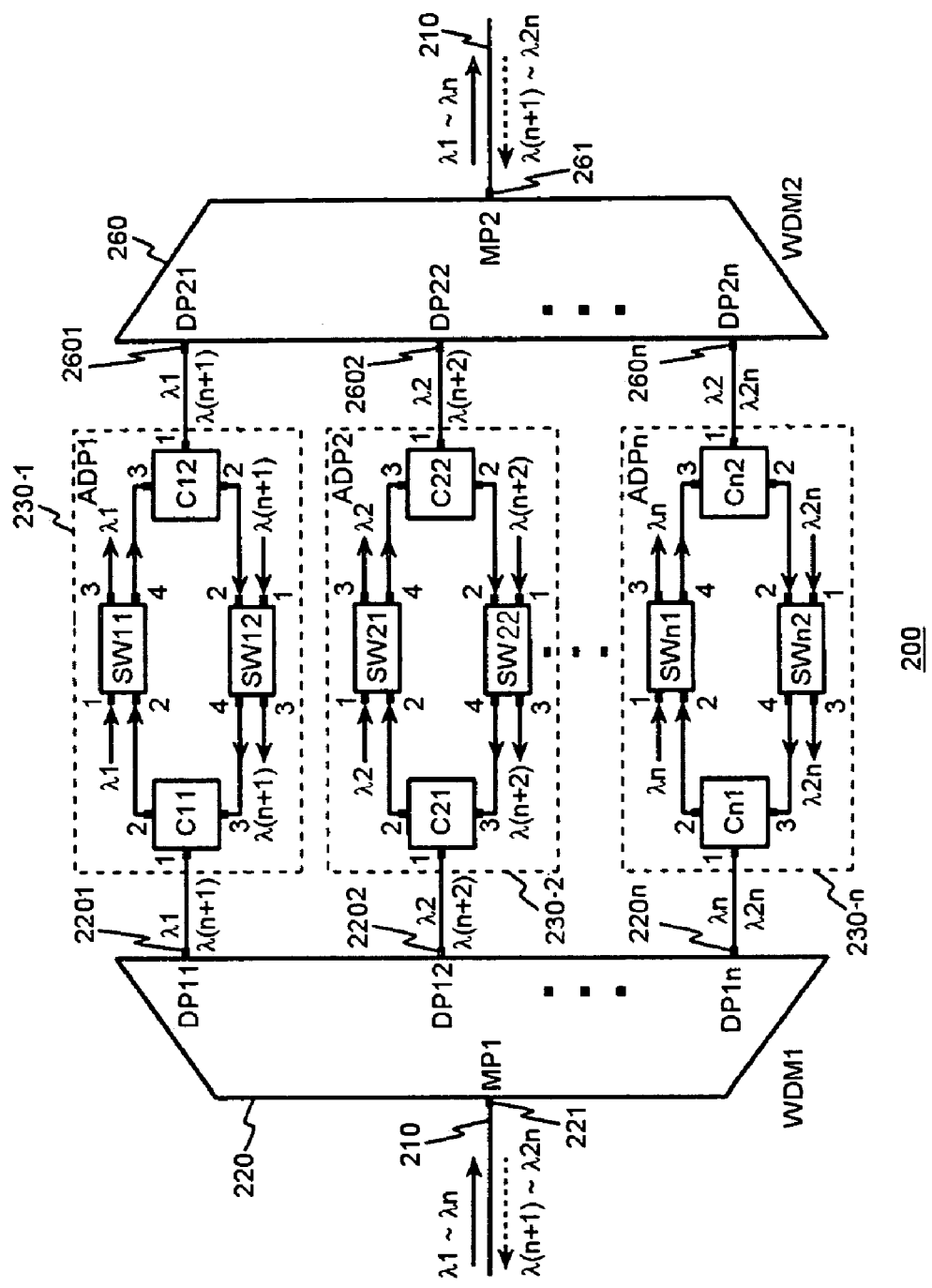
FIG. 2 shows a construction of a bi-directional optical add/drop multiplexer for wavelength division multiplexing optical networks according to the present invention.
Figure 3:
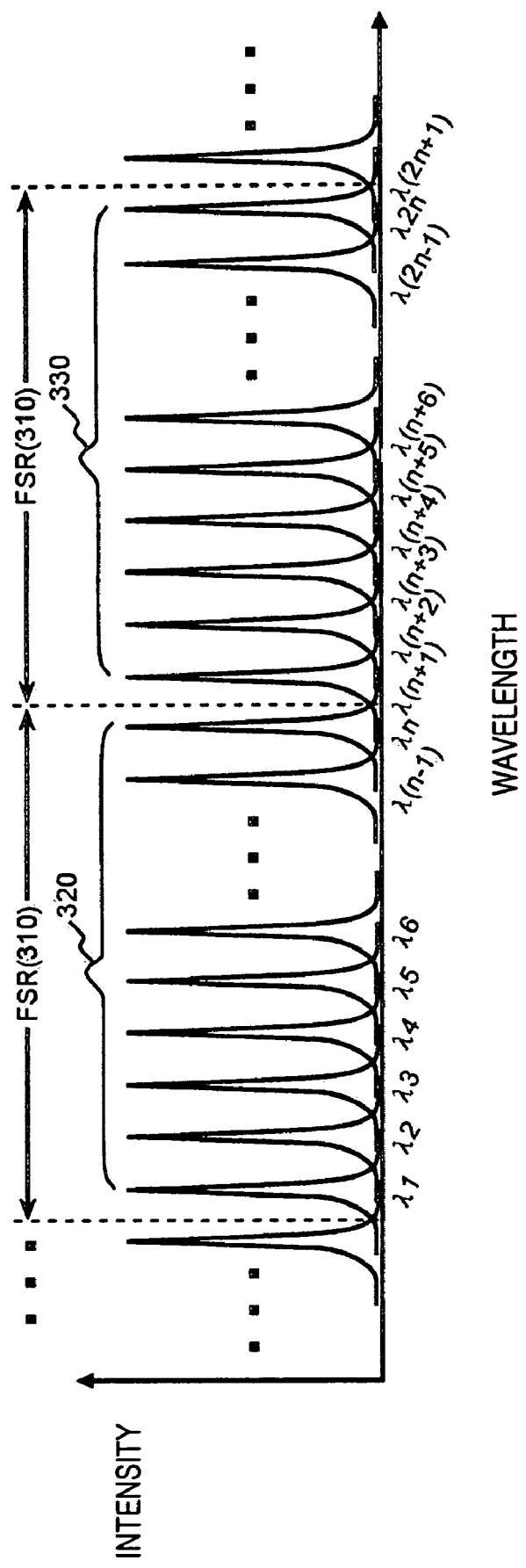
FIG. 3 shows wavelength bands used in the bi-directional optical add/drop multiplexer shown in FIG. 2.

FIG. 2 shows a construction of a bi-directional optical add/drop multiplexer according to the present invention. FIG. 3 shows wavelength bands used in the bi-directional optical add/drop multiplexer shown in FIG. 2. The bi-directional optical add/drop multiplexer 200 includes two wavelength division multiplexers (WDMs) 220,260 and n optical add/drop parts (ADPs) 230-1 to 230-n, each of which is connected between the first and second WDMs 220,260.

The first WDM 220 is provided with a first left-side multiplexing port (MP) 221 connected with an optical fiber 210 for transmitting multiplexed optical signals, and n left-side demultiplexing ports (DPs) 2201 to 220n functioning as paths for demultiplexed channels. The first WDM 220 demultiplexes multiplexed forward optical signals input into the first left-side MP 221 to output the demultiplexed channels, respectively. The first WDM 220 also multiplexes channels input into the n left-side DPs 2201 to 220n to output the multiplexed backward optical signals to the first left-side MP 221.

For example, the first WDM 220 outputs the second channel $\lambda 2$ to the second left-side DP 2202, and outputs the $n^{th}$ channel $\lambda n$ to the $n^{th}$ left-side DP 220n. Here, the forward optical signals include the first to $n^{th}$ channels $\lambda 1$ to $\lambda n$, while the backward optical signals also include $(n+1)^{th}$ to $(2n)^{th}$ channels $\lambda(n+1)$ to $\lambda(2n)$. In the first and second WDMs 220,260, a pass wavelength band is periodically repeated. Here, the pass wavelength band per period is referred to as a "free spectral range (FSR)". Referring to FIG. 3, of the two FSRs 310 in the first and second WDMs 220,260, one includes a wavelength band 320 of the forward optical signals, the other includes a wavelength band 330 of the backward optical signals. One example of the first WDM 220 or second WDM 260 is an arrayed-waveguide grading which has an extensible channel, simple control, and excellent integration.

The n add/drop parts 230-1 to 230-n are connected between then left-sided DPs 2201 to 220n and the n right-sided DPs 2601 to 260n. Each of the add/drop parts 230-1 to 230-n include a pair of left- and right-side couplers C11 and C12; C21 and C22; . . . ; and Cn1 and Cn2, and a pair of upper and lower optical switches SW11 and SW12; SW21 and SW22; . . . ; and SWn1 and SWn2. The n add/drop parts 230-1 to 230-n all have the same configuration as each other. Thus, the first add/drop part 230-1 alone will be described below.

The left-side coupler C11 of the first add/drop part 230-1 includes three ports C111 to C113. The first port C111 is connected to the first left-side DP 2201 of the first WDM 220, the second port C112 is connected to a second port SW112 of the upper optical switch SW11, and the third port C113 is connected to a fourth port SW124 of the lower optical switch SW12. The left-side coupler C11 outputs the first channel $\lambda 1$ input into the first port C111 to the second port C112, and outputs the $(n+1)^{th}$ channel $\lambda(n+1)$ input into the third port C113 to the first port C111.

The upper optical switch SW11 of the first add/drop part 230-1 is provided with first and second ports SW111,SW112 on one side, and with third and fourth ports SW113,SW114 on the other side. The first and third ports SW111,SW113 as well as the second and four ports SW112,SW114 are parallel connected in a bar state, while the first and fourth ports SW111,SW114 as well as the second and third ports SW112, SW113 are crisscross connected in a cross state. The second port SW112 of the upper optical switch SW11 is connected to the second port C112 of the first left-side coupler C11. While the fourth port SW114 is connected to a third port C122 of the first right-side coupler C11.

In the cross state, the upper optical switch SW11 outputs the first channel $\lambda 1$ input into the first port SW111 to the fourth port SW114, so that the first channel $\lambda 1$ is combined with the forward optical signals. Further, the upper optical switch SW11 outputs the first channel $\lambda 1$ input into the second port SW112 to the third port SW113, so that the first channel $\lambda 1$ may be branched. In the bar state, the upper optical switch SW11 outputs the first channel $\lambda 1$ input into the second port SW112, to the fourth port SW114, so that the first channel $\lambda 1$ goes through without any change.

The lower optical switch SW12 of the first add/drop part 230-1 is provided with first and second ports SW121,SW122 on one side, and with third and fourth ports SW123,SW124 on the other side. The first and third ports SW121, SW123 as well as the second and four ports SW122,SW124 are parallel connected in the bar state. While the first and fourth ports SW121,SW124 as well as the second and third ports SW122,SW123 are crisscross connected in the cross state. The second port SW122 of the lower optical switch SW12 is connected to the second port C122 of the right-side coupler C12, while the fourth port SW114 is connected to the third port C113 of the left-side coupler C11.

In the cross state, the lower optical switch SW12 outputs the $(n+1)^{th}$ channel $\lambda(n+1)$ input into the first port SW121 to the fourth port SW124, so that the $(n+1)^{th}$ channel $\lambda(n+1)$ is combined with the backward optical signals. Further, the lower optical switch SW12 outputs the $(n+1)^{th}$ channel $\lambda(n+1)$ input into the second port SW122 to the third port SW123, so that the $(n+1)^{th}$ channel $\lambda(n+1)$ may be branched. In the bar state, the first lower optical switch SW12 outputs the $(n+1)^{th}$ channel $\lambda(n+1)$ input into the second port SW122 to the fourth port SW124, so that the $(n+1)^{th}$ channel $\lambda(n+1)$ goes through without any change.

The first right-side coupler C12 of the first add/drop part 230-1 includes three ports C121 to C123. The first port C121 is connected to the first right-side DP 2601 of the second WDM 260, the second port C122 is connected to the second port SW122 of the lower optical switch SW12, and the third port C123 is connected to the fourth port SW114 of the upper optical switch SW11. The right-side coupler C12 outputs the first channel $\lambda 1$ input into the third port C123 to the first port C121, and outputs the $(n+1)^{th}$ channel $\lambda(n+1)$ input into the first port C121 to the second port C122.

The second WDM 260 is provided with a right-side multiplexing port (MP) 261 connected with an optical fiber 210 for transmitting multiplexed optical signals The second WDM 260 is also provided with right-sided DPs 2601 to 260n functioning as paths for demultiplexed channels. The second WDM 260 multiplexes a plurality of channels input into the n right-side DPs 2601 to 260n to output the multiplexed optical signals to the right-side MP 261.

Hereinafter, a description will be made, for example, regarding a first case where the optical add/drop multiplexer 200 drops the first channel $\lambda 1$ from the forward optical signals i including the first to $n^{th}$ channels $\lambda 1$ to $\lambda n$, and a second case where the optical add/drop multiplexer 200 adds the $(2n)^{th}$ channel $\lambda(2n)$ to the backward optical signals including the $(n+1)^{th}$ and $(2n-1)^{th}$ channels $\lambda(n+1)$ and $\lambda(2n-1)$.

A controlling part (not shown) controls the upper optical switch SW11 and $n^{th}$ lower optical switch SWn2 into the cross state, and the other optical switches into the bar state.

In terms of the first case, the first WDM 220 demultiplexes forward optical signals input into the left-side MP 221 to output demultiplexed n channels λ1 to λn to the n left-side DPs 2201 to 220n. The left-side coupler C11 of the first add/drop part 230-1 outputs the first channel λ1 input the first port C111 to the second port C112. The upper optical switch SW11 outputs the first channel λ1 input into the second port SW112 to the third port SW113, thus branching the first channel λ1. The second to $n^{th}$ add/drop parts 230-2 and 230-n allow the input of the second to $n^{th}$ channels λ2 to λn to go through without any change. The second WDM 260 multiplexes the second to $n^{th}$ channels λ2 to λn input into the second to $n^{th}$ right-side DPs 2602 to 260n to output the multiplexed optical signals to the first right-side MP 261.

In terms of the second case, the second WDM 260 demultiplexes the backward optical signals input into the right-side MP 261 to output the demultiplexed $(n+1)^{th}$ to $(2n-1)^{th}$ channels λ(n+1) to λ(2n-1) to the n right-side DPs 2601 to 260n. The $n^{th}$ lower optical switch SWn2 of the $n^{th}$ ADP 230-n outputs the $(2n)^{th}$ channel λ(2n) input into the first port SWn21 to the fourth port SWn24. The $(2n)^{th}$ channel λ(2n) from the fourth port SWn24 is input into the third port Cn13 of the left-side coupler Cn1 to the first port Cn1. Then-1ADPs 230-1 to 230-(n-1) allow the n-1 channels λ1 to λ(n-1) to go through without any change. The first WDM 220 multiplexes the $(n+1)^{th}$ and $(2n)^{th}$ channels λ(n+1) and λ(2n) input into the n left-sided DPs 2201 to 220n to output the multiplexed optical signals to the left-side MP 221.

Hereinafter, the $n^{th}$ ADP which may be applied to the bi-directional optical add/drop multiplxer 200 shown in FIG. 2 will be described as a plurality of embodiments.

Figure 4:
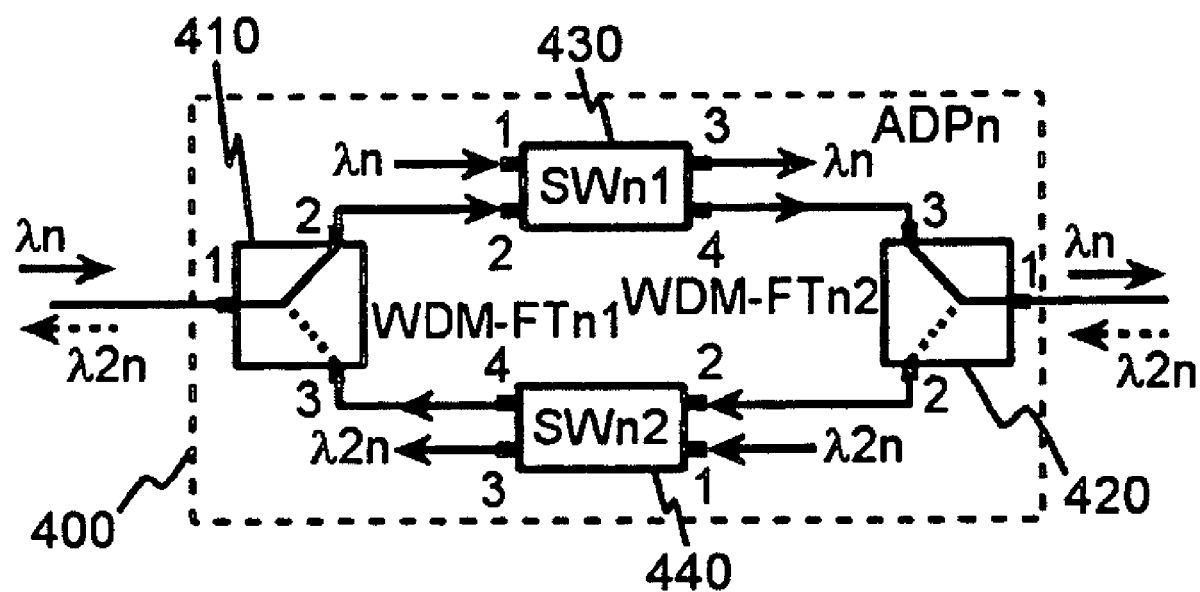
FIG. 4 shows a construction of an $n^{th}$ ADP according to a first embodiment of the present invention.

FIG. 4 shows a construction of an $n^{th}$ ADP according to a first embodiment of the present invention. The $n^{th}$ ADP 400 includes left- and right-side WDM filters 410, 420, and upper and lower optical switches 430,440. Hereinafter, an overlapped description will be omitted.

The left- and right-side WDM filters 410,420 are each provided with three ports 4101 to 4103 and 4201 to 4203. The left- and right-side WDM filters 410,420 spatially divide the $n^{th}$ and $(2n)^{th}$ channels λn,λ(2n) input through the first ports 4101,4202 according to a wavelength and output the divided channels to the second and third ports 4102,4103 and 4202,4203. The left- and right-side WDM filters 410 and 420 have an advantage in that they have a wide wavelength bandwidth which can be allocated to each of the second and third ports 4102,4103 and 4202, 4203, which can be implemented economically.

The following description will be made regarding a first process in which the $n^{th}$ ADP 400 drops the $n^{th}$ channel λn and then adds a new $n^{th}$ channel λn, and a second process in which the $n^{th}$ ADP 400 drops the $(2n)^{th}$ channel λ(2n) and then adds a new $(2n)^{th}$ channel λ(2n), as examples.

A controlling part (not shown) controls the upper optical switch 430 and lower optical switch 440 into the cross state. First, in terms of the first process, the left-side WDM filter 410 outputs the $n^{th}$ channel λn input into the first port 4101 to the second port 4102. The upper optical switch 430 outputs the $n^{th}$ channel λn input into the second port 4302 to the third port 4303, thus dropping the $n^{th}$ channel λn. Further, the upper optical switch 430 outputs the $n^{th}$ channel input into the first port 4301 to the fourth port 4304. The right-sided WDM filter 420 outputs the $n^{th}$ channel λn input into the third port 4203 to the first port 4201.

In terms of the second process, the right-sided WDM filter 420 outputs the $(2n)^{th}$ channel λ(2n) input into the first port 4201 to the second port 4202. The lower optical switch 440 outputs the $(2n)^{th}$ channel λ(2n) input into the second port 4402 to the third port 4403, thus dropping the $(2n)^{th}$ channel λ(2n). Further, the lower optical switch 440 outputs the $(2n)^{th}$ channel λ(2n) input into the first port 4401 to the fourth port 4404. The left-side WDM filter 410 outputs the $(2n)^{th}$ channel λ(2n) input into the third port 4103 to the first port 4101.

Figure 5:
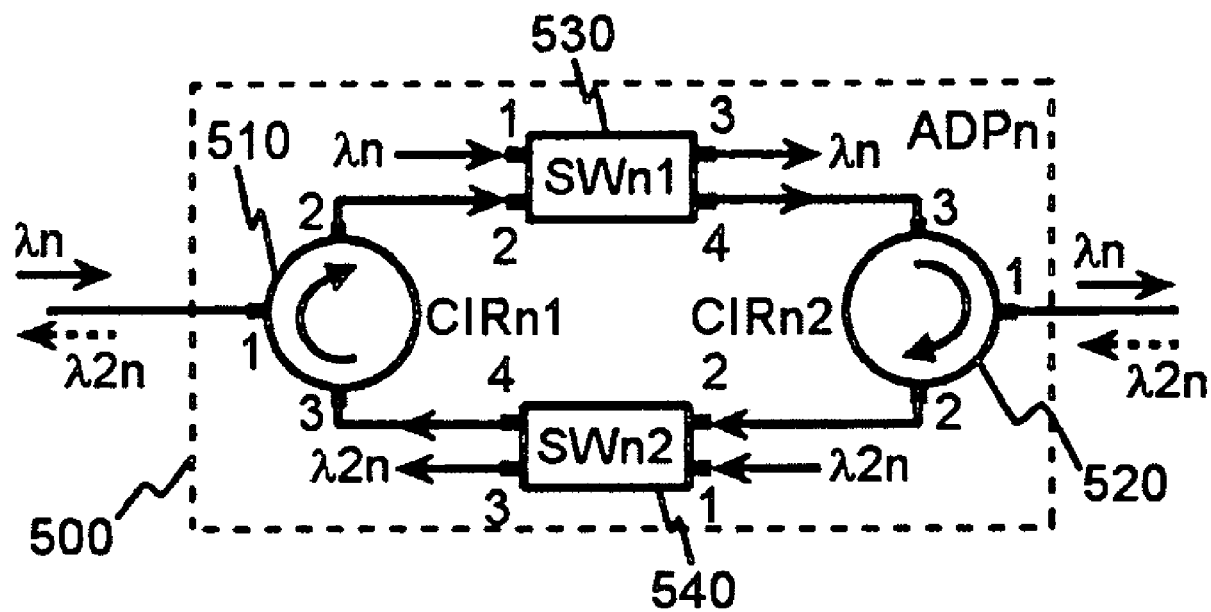
FIG. 5 shows a construction of an $n^{th}$ ADP according to a second embodiment of the present invention.

FIG. 5 shows a construction of an $n^{th}$ ADP according to a second embodiment of the present invention. The $n^{th}$ ADP 500 includes left- and right-sided circulators 510, 520, and upper and lower optical switches 530,540. Hereinafter, an overlapped description will be omitted.

The left- and right-side circulators 510,520 are each provided with three ports 5101 to 5103; and 5201 to 5203. Each of the left- and right-side circulators 510,520 output the $n^{th}$ or $(2n)^{th}$ channel λn or λ(2n) input into an upper port to an adjacent lower port. The left- and right-sided circulators 510,520 are wavelength independent type devices, so that there is an advantage in that compatibility is assured.

The following description will be made regarding a first process in which the $n^{th}$ ADP 500 drops a $n^{th}$ channel λn and then adds a new $n^{th}$ channel λn, and a second process in which the $n^{th}$ ADP 500 drops a $(2n)^{th}$ channel λ(2n) and then adds a new $(2n)^{th}$ channel λ(2n), as examples.

A controlling part (not shown) controls the upper optical switch 530 and lower optical switch 540 into the cross state. First, in terms of the first process, the left-side circulator 510 outputs the $n^{th}$ channel λn input into the first port 5101 to the second port 5102. The upper optical switch 530 outputs the $n^{th}$ channel λn input into the second port 5302 to the third port 5303, thus dropping the $n^{th}$ channel λn. Further, the upper optical switch 530 outputs the $n^{th}$ channel input into the first port 5301 to the fourth port 5304. The right-sided circulator 520 outputs the $n^{th}$ channel λn input into the third port 5203 to the first port 5201.

In terms of the second process, the right-side circulator 520 outputs the $(2n)^{th}$ channel λ(2n) input into the first port 5201 to the second port 5202. The lower optical switch 540 outputs the $(2n)^{th}$ channel λ(2n) input into the second port 5402 to the third port 5403, thus dropping the $(2n)^{th}$ channel λ(2n). Further, the lower optical switch 540 outputs the $(2n)^{th}$ channel λ(2n) input into the first port 5401 to the fourth port 5404. The left-side circulator 510 outputs the $(2n)^{th}$ channel λ(2n), which is input into the third port 5103, to the first port 5101.

Figure 6:
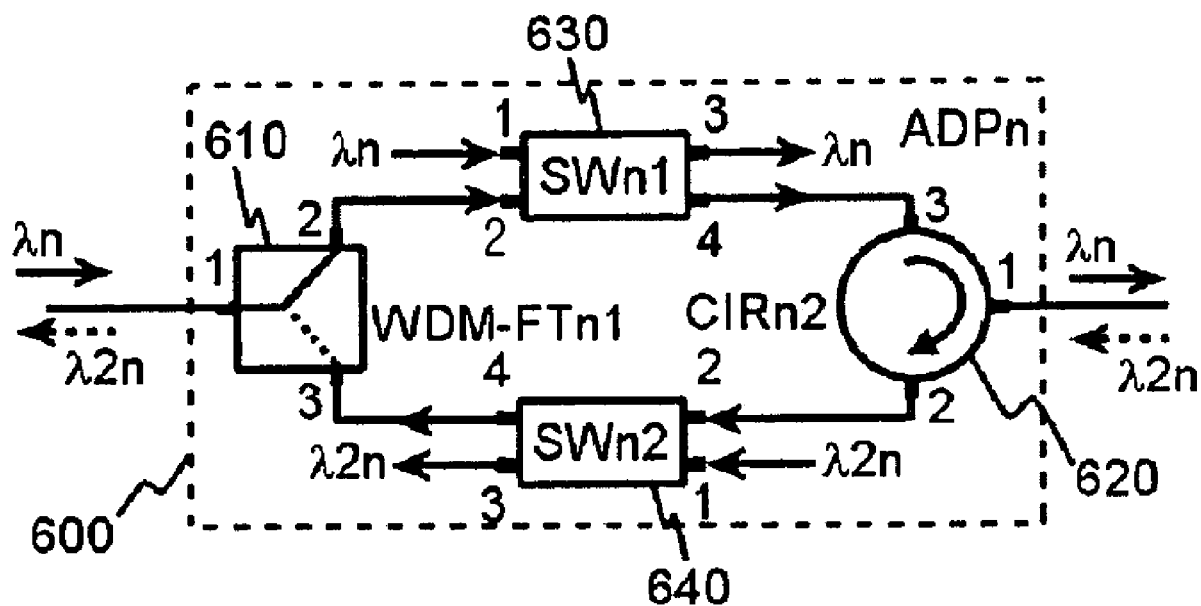
FIG. 6 shows a construction of an $n^{th}$ ADP according to a third embodiment of the present invention.

FIG. 6 shows a construction of an $n^{th}$ ADP according to a third embodiment of the present invention. The $n^{th}$ ADP 600 includes a left-side WDM filter 610 and a right-side circulator 620, and upper and lower optical switches 630, 640. The construction shown in FIG. 6 has an advantage in that a cross-talk can be prevented. The cross-talk can be caused by relative intensity noise (RIN) constituting reflective light, amplified spontaneous emission (ASE)generated inside of the bi-directional optical add/drop multiplexer, inside of an optical amplifier connected to the optical add/drop multiplexer, or from a connection between the optical amplifier and the optical add/drop multiplexer. Hereinafter, an overlapped description will be omitted.

The following description will be made regarding a first process in which the $n^{th}$ ADP 600 removes a $n^{th}$ channel λn which is input by outside reflection again, and a second process in which the $n^{th}$ ADP 600 removes a $(2n)^{th}$ channel λ(2n), as examples.

A controlling part (not shown) controls the upper optical switch 630 and lower optical switch 640 into the bar state. In terms of the first process, the left-side WDM filter 610 outputs the $n^{th}$ channel λn input into the first port 6101 to the second port 6102. The upper optical switch 630 outputs the n$^{th}$ channel λn input into the second port 6302 to the fourth port 6304. The right-side circulator 620 outputs the n$^{th}$ channel λn input into the third port 6203 to the first port 6201. The n$^{th}$ channel λn input into the first port 6201 of the right-side circulator 620 by outside reflection is output to the second port 6202. The lower optical switch 640 outputs the n$^{th}$ channel input into the second port 6402 to the fourth port 6404. The n$^{th}$ channel λn input into the third port 6103 of the left-side WDM filter 610 has a wavelength beyond the wavelength band allocated to the third port 6103, so that it is dissipated due to non-existence of its inner propagation path.

In terms of the second process, the right-side circulator 620 outputs the (2n)$^{th}$ channel λ(2n) input into the first port 6201 to the second port 6202. The lower optical switch 640 outputs the (2n)$^{th}$ channel λ(2n) input into the second port 6402 to the fourth port 6404. The (2n)$^{th}$ channel λ(2n) input into the third port 6103 of the left-sided WDM filter 610 has a wavelength beyond the wavelength band allocated to the third port 6103, so that it is dissipated due to non-existence of its inner propagation path.

Figure 7:
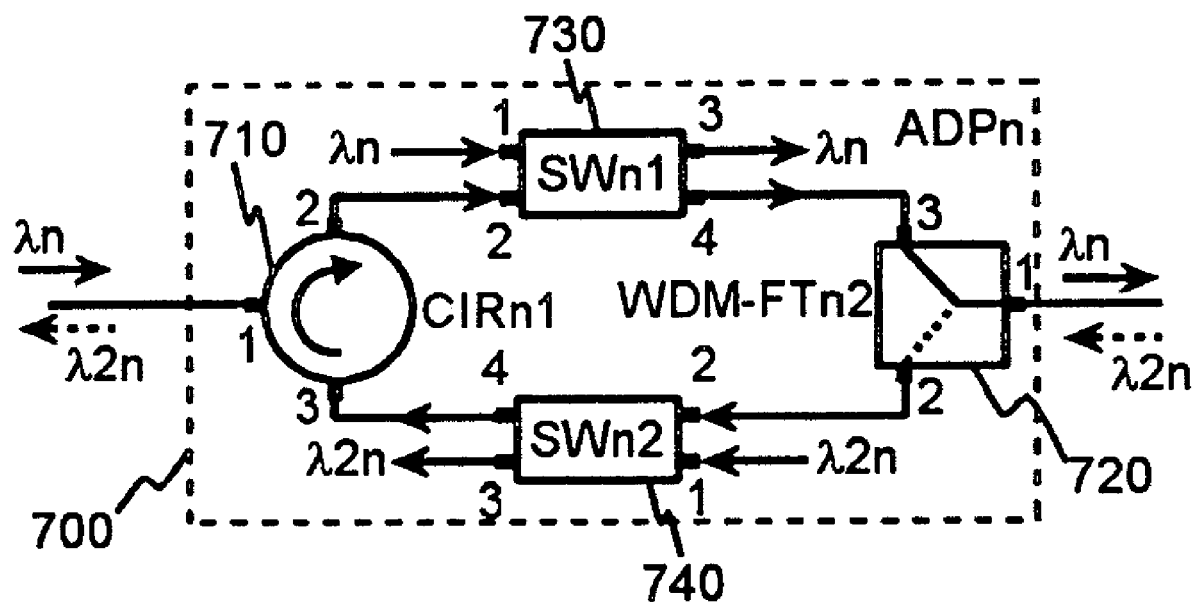
FIG. 7 shows a construction of an $n^{th}$ ADP according to a fourth embodiment of the present invention.

FIG. 7 shows a construction of an n$^{th}$ ADP according to a fourth embodiment of the present invention. The n$^{th}$ ADP 700 includes a left-side circulator 710, a right-side WDM filter 720, and upper and lower optical switches 730,740. The construction shown in FIG. 7 has an advantage in that a cross-talk can be prevented. The cross-talk may be caused by relative intensity noise (RIN) constituting reflective light, amplified spontaneous emission (ASE), etc. which are generated inside of the bi-directional optical add/drop multiplexer, inside of an optical amplifier connected to the optical add/drop multiplexer, or from a connection between the optical amplifier and the optical add/drop multiplexer. Hereinafter, an overlapped description will be omitted.

The following description will be made regarding a first process in which the n$^{th}$ ADP 700 removes the n$^{th}$ channel λn, and a second process in which the n$^{th}$ ADP 700 removes the (2n)$^{th}$ channel λ(2n) which is input by outside reflection again, as examples.

A controlling part (not shown) controls the upper optical switch 730 and lower optical switch 740 into the bar state. In terms of the first process, the left-side circulator 710 outputs the n$^{th}$ channel λn input into the first port 7101 to the second port 7102. The upper optical switch 730 outputs the n$^{th}$ channel λn input into the second port 7302 to the fourth port 7304. The n$^{th}$ channel λn input into the third port 7203 of the right-side WDM filter 720 has a wavelength beyond the wavelength band allocated to the third port 7203, so that it is dissipated due to non-existence of its inner propagation path.

In terms of the second process, the right-side WDM filter 720 outputs the (2n)$^{th}$ channel λ(2n) input into the first port 7201 to the second port 7202. The lower optical switch 740 outputs the (2n)$^{th}$ channel λ(2n) input into the second port 7402 to the fourth port 7404. The left-side circulator 710 outputs the (2n)$^{th}$ channel λ(2n) input into the third port 7103 to the first port 7101. The (2n)$^{th}$ channel λ(2n), which is input again into the first port 7101 of the left-side circulator 710 by outside reflection, is output to the second port 7102. The upper optical switch 730 outputs the (2n)$^{th}$ channel λ(2n) input into the second port 7304 to the fourth port 7304. The (2n)$^{th}$ channel λ(2n) input into the third port 7203 of the right-side WDM filter 720 has a wavelength beyond the wavelength band allocated to the third port 7203, so that it is dissipated due to non-existence of its inner propagation path.

As mentioned above, the bi-directional optical add/drop multiplexer according to the present invention is designed so that a period of the FSR, which each of the first and second WDMs has, includes a wavelength band of the forward optical signals, while another period of the FSR includes a wavelength band of the backward optical signals. Thus, there is an advantage in that the number of the available channels can be extended.

What is claimed is:

1. A bi-directional optical add/drop multiplexer which is connected to an optical fiber for transmitting optical signals multiplexed in a wavelength division multiplexing optical network and which performs adding/dropping of the optical signals, the bi-directional optical add/drop multiplexer comprising:

a first wavelength division multiplexer provided with a multiplexing port providing a path for a forward or backward optical signal and with a plurality of demultiplexing ports, each providing a path for demultiplexed channels;

a plurality of add/drop parts, each performing adding or dropping of predetermined channels, and connected with the demultiplexing ports of the first wavelength division multiplexer, each said plurality of add/drop parts including: a first coupler connected with a corresponding demultiplexing port of the first wavelength division multiplexer; a second coupler, connected with a corresponding demultiplexing port of the second wavelength division multiplexer, providing a path of a corresponding forward channel and a path of a corresponding backward channel, together with the first coupler; a first optical switch, disposed on the path of the corresponding forward channel, for adding or dropping the corresponding forward channel; and a second optical switch, disposed on the path of the corresponding backward channel, for adding or dropping the corresponding backward channel; and a second wavelength division multiplexer provided with a plurality of demultiplexing ports, each providing a path for demultiplexed channels and with a multiplexing port providing a path for the forward or backward optical signal, the plurality of demultiplexing ports of the second wavelength division multiplexer connected to the plurality of add/drop parts, wherein the first wavelength division multiplexer has a free spectral range equal to that of the second wavelength division multiplexer, in which a wavelength band of the forward optical signals is included in the free spectral range having one period, while a wavelength band of the backward optical signals is included in the free spectral range having another period.

2. A bi-directional optical add/drop multiplexer according to claim 1, wherein:

the first coupler comprises a first wavelength division multiplexing filter having wavelength dependency, the first wavelength division multiplexing filter being provided with a first port connected with the corresponding demultiplexing port, a second port for forming the path of the corresponding forward channel, and a third port for forming the path of the corresponding backward channel; and the second coupler comprises a second wavelength division multiplexing filter having wavelength dependency, the second wavelength division multiplexing filter being provided with a first port connected with the corresponding demultiplexing port, a second port for forming the path of the corresponding backward channel traveling, and a third port for forming the path of the corresponding forward channel.

3. A bi-directional optical add/drop multiplexer according to claim 1, wherein:

the first coupler comprises a first circulator having wavelength independency, the first wavelength division multiplexing filter being provided with a first port connected with the corresponding demultiplexing port, a second port for forming the path of the corresponding forward channel, and a third port for forming the path of the corresponding backward channel; and the second coupler comprises a second circulator having wavelength independency, the second circulator being provided with a first port connected with the corresponding demultiplexing port, a second port for forming the path of the corresponding backward channel traveling, and a third port for forming the path of the corresponding forward channel.

4. A bi-directional optical add/drop multiplexer according to claim 1, wherein:

the first coupler comprises a wavelength division multiplexing filter having wavelength dependency, the wavelength division multiplexing filter being provided with a first port connected with the corresponding demultiplexing port, a second port for forming the path of the corresponding forward channel, and a third port for forming the path of the corresponding backward channel; and the second coupler comprises a circulator having wavelength independency, the circulator being provided with a first port connected with the corresponding demultiplexing port, a second port for forming the path of the corresponding backward channel, and a third port for forming the path of the corresponding forward channel.

5. A bi-directional optical add/drop multiplexer according to claim 1, wherein:

the first coupler comprises a circulator having wavelength independency, the circulator being provided with a first port connected with the corresponding demultiplexing port, a second port for forming the path of the corresponding forward channel, and a third port for forming the path of the corresponding backward channel; and the second coupler comprises a wavelength division multiplexing filter having wavelength dependency, the wavelength division multiplexing filter being provided with a first port connected with the corresponding demultiplexing port, a second port for forming the path of the corresponding backward channel, and a third port for forming the path of the corresponding forward channel.

6. A bi-directional optical add/drop multiplexer which is connected to an optical fiber for transmitting optical signals multiplexed in a wavelength division multiplexing optical network and which performs adding/dropping of the optical signals, the bi-directional optical add/drop multiplexer comprising:

a first wavelength division multiplexer provided with a multiplexing port providing a path for a forward or backward optical signal and with a plurality of demultiplexing ports, each providing a path of demultiplexed channels;

a plurality of add/drop parts, each performing adding or dropping of predetermined channels, and connected with the demultiplexing ports of the first wavelength division multiplexer; and a second wavelength division multiplexer provided with a plurality of demultiplexing ports, each providing a path for demultiplexed channels and with a multiplexing port providing a path for the forward or backward optical signal, the plurality of demultiplexing ports of the second wavelength division multiplexer connected to the plurality of add/drop parts, wherein each of the add/drop parts includes:

a first coupler connected with a corresponding demultiplexing port of the first wavelength division multiplexer;

a second coupler, connected with a corresponding demultiplexing port of the second wavelength division multiplexer, providing a path of a corresponding forward channel and a path of a corresponding backward channel, together with the first coupler;

a first optical switch, disposed on the path of the corresponding forward channel, for adding or dropping the corresponding forward channel; and a second optical switch, disposed on the path of the corresponding backward channel, for adding or dropping the corresponding backward channel.

7. A bi-directional optical add/drop multiplexer according to claim 6, wherein the first wavelength division multiplexer has a free spectral range equal to that of the second wavelength division multiplexer.

8. A bi-directional optical add/drop multiplexer according to claim 7, wherein the free spectral range includes a wavelength band of the forward optical signals and a wavelength band of the backward optical signals.

9. A bi-directional optical add/drop multiplexer according to claim 6, wherein:

the first coupler comprises a first wavelength division multiplexing filter provided with a first port connected with the corresponding demultiplexing port, a second port for forming the path of the corresponding forward channel, and a third port for forming the path of the corresponding backward channel; and the second coupler comprises a second wavelength division multiplexing filter provided with a first port connected with the corresponding demultiplexing port, a second port for forming the path of the corresponding backward channel traveling, and a third port for forming the path of the corresponding forward channel.

10. A bi-directional optical add/drop multiplexer according to claim 6, wherein:

the first coupler comprises a first circulator provided with a first port connected with the corresponding demultiplexing port, a second port for forming the path of the corresponding forward channel, and a third port for forming the path of the corresponding backward channel; and the second coupler comprises a second circulator provided with a first port connected with the corresponding demultiplexing port, a second port for forming the path of the corresponding backward channel traveling, and a third port for forming the path of the corresponding forward channel.

11. A bi-directional optical add/drop multiplexer according to claim 6, wherein:

the first coupler comprises a wavelength division multiplexing filter provided with a first port connected with the corresponding demultiplexing port, a second port for forming the path of the corresponding forward channel, and a third port for forming the path of the corresponding backward channel; and the second coupler comprises a circulator provided with a first port connected with the corresponding demultiplexing port, a second port for forming the path of the corresponding backward channel, and a third port for forming the path of the corresponding forward channel.

12. A bi-directional optical add/drop multiplexer according to claim 6, wherein:

the first coupler comprises a circulator provided with a first port connected with the corresponding demultiplexing port, a second port for forming the path of the corresponding forward channel, and a third port for forming the path of the corresponding backward channel; and the second coupler comprises a wavelength division multiplexing filter provided with a first port connected with the corresponding demultiplexing port, a second port for forming the path of the corresponding backward channel, and a third port for forming the path of the corresponding forward channel.

* * * * *